INVENTOR
Leon F. Meunier
BY
Raymond G. Muller
ATTORNEY

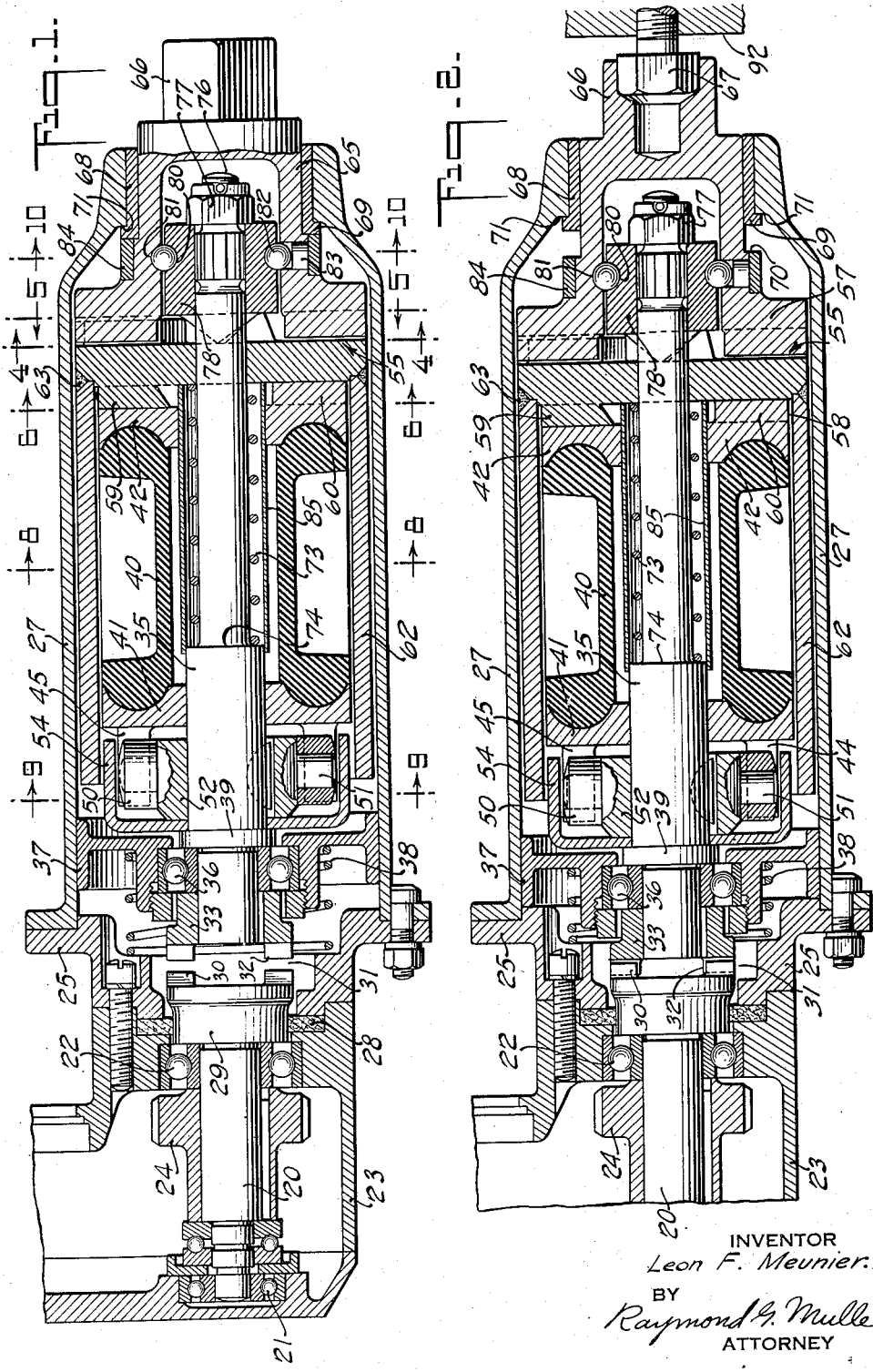

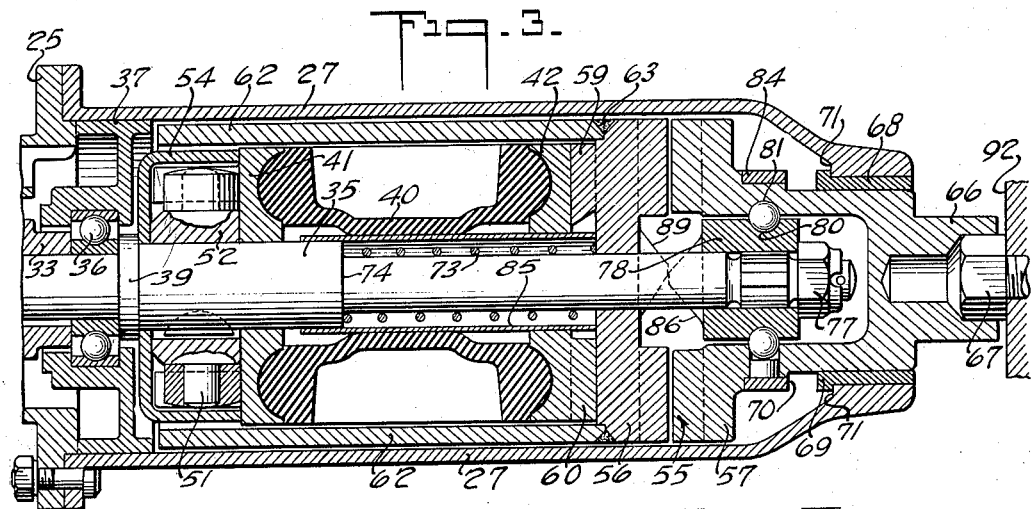
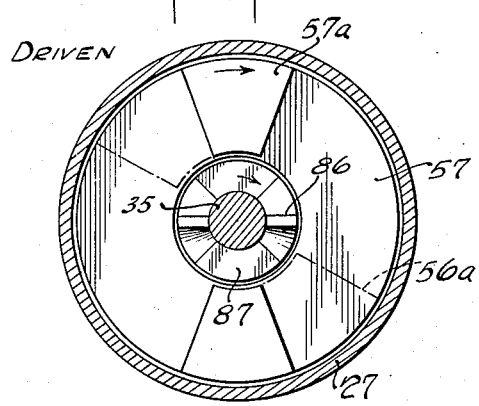
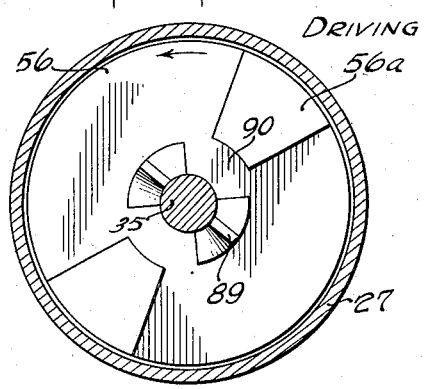
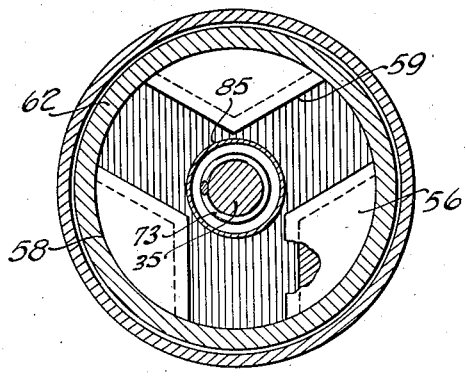
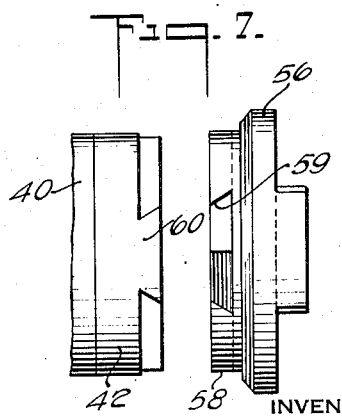
INVENTOR
Leon F. Meunier.
BY
ATTORNEY Nov. 24, 1936. L. F. MEUNIER 2,061,843
NUT RUNNER
Filed Feb. 12, 1935 3 Sheets-Sheet 3

Patented Nov. 24, 1936

2,061,843

UNITED STATES PATENT OFFICE 2,061,843

NUT RUNNER

Leon F. Meunier, Cleveland, Ohio, assignor to Chicago Pneumatic Tool Company, New York, N. Y., a corporation of New Jersey Application February 12, 1935, Serial No. 6,152

11 Claims. (Cl. 81—54)

This invention relates to devices for driving threaded securing elements, and more particularly to a motor-operated nut runner or screw driver adapted to overcome resistance in excess of the torque delivered by the motor.

The invention makes use of energy accumulator means cooperating with a clutch adapted to convert the uniform rotation of a prime mover into a series of intermittent rotational jars imparted to the driven nut or screw. By the use of an arrangement of this type, a motor of relatively low horse power and light weight may be employed to drive a nut to its home position with the desired degree of tightness without resorting to the use of a manually operated wrench often found necessary after the motor fails to overcome the final resistance offered by the nut.

An object of the invention is to secure blows or jars of substantially uniform strength whereby the number of blows indicates to the operator the degree of tightness of the nut.

A further object of the invention is the provision of a rotational impact device that is reliable in operation over a long period of use.

In accordance with the above and other objects, the invention comprises an impact clutch driven by a torsional member or accumulator, characterized by mechanism for automatically engaging and disengaging the clutch plates. A spring may be employed for yieldingly holding the clutch plates together while positive means, in the form of cams, are provided for effecting the declutching action against the spring pressure. The cams are so constructed and arranged that operation of the declutching means is responsive to a predetermined torsion in the accumulator member.

A still further object of the invention is to adapt all parts of the nut runner, including the clutch and cam disengaging means, for operation in either a right-hand or a left-hand direction.

Other objects and features of the invention will appear more clearly from the following description taken in connection with the accompanying drawings and appended claims.

In the drawings, which illustrate one embodiment of the invention:

Fig. 1 is a cross section of a portable nut runner incorporating the invention, the view being broken away at one end to omit the motor or prime mover. In this figure the parts are shown in the inoperative position;

Fig. 2 is a section similar to Fig. 1, showing the parts in the position that they occupy at the start of the nut running operation;

Fig. 3 is a view similar to Fig. 1 showing the position of the parts at the instant that the impact clutch is disengaged, the nut being in approximately its home position;

Fig. 4 is a cross section, as indicated by the arrows 4—4 in Fig. 1, the driven plate of the impact clutch being shown in full lines and the driving lugs in broken lines;

Fig. 5 is a cross section as indicated by the arrows 5—5 in Fig. 1 showing the driving plate of the impact clutch;

Fig. 6 is a cross-section indicated by the arrows 6—6 in Fig. 1 showing the rearward face of the clutch driving plate;

Fig. 7 is a fragmentary elevational view showing the driving clutch plate and the adjacent portion of the accumulator member, prior to the assembly of these parts;

Figure 8:
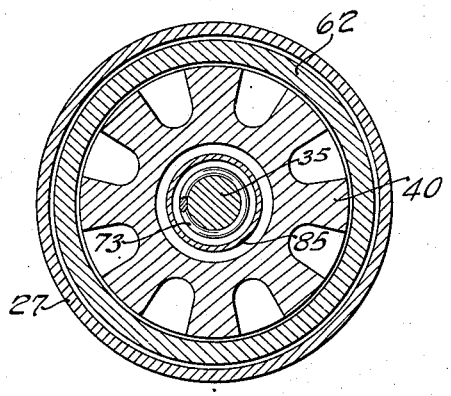
Fig. 8 is a cross section as indicated by the arrows 8—8 in Fig. 1.

Referring to Fig. 1, the preferred form of the invention is illustrated as a nut runner adapted to be driven by a portable electric or rotary air motor (not shown). A driver spindle 20 is supported by bearings 21 and 22 in a gear case 23. A gear 24, keyed to the driver spindle, is adapted to be driven by the motor or prime mover through suitable connections (not shown). The forward end of the gear case is bolted to an adapter plate 25, which in turn is bolted to a guide casing 27. Suitable packing 28, clamped between the adapter plate and the gear case engages the circumference of a head 29 on the driver spindle 20, to prevent escape of lubricant from the gear case.

Head 29 on the driver spindle is provided with driving teeth 30 forming part of a manually controlled disconnect clutch 31. Teeth 32 are provided on the driven clutch plate 33 which is fixed to a drive rod 35. The rear end of the drive rod 35 is rotatably supported in a bearing 36 carried by a center plate 37 which has a sliding fit with the inside wall of the guide casing 27. A disengaging spring 38 interposed between the adapter and the center plate urges the latter forwardly. Forward movement of the center plate 37 is transmitted to the drive rod through bearing 36 and an annular flange 39 on the drive rod engaging one end of the bearing. When the tool is not in operative relation with respect to a driven nut, the action of the spring is to hold the driven plate 32 out of engagement with the driving plate 30 whereby the drive rod 35 is disconnected from the source of power. Rotation of the drive rod is effected by pushing it rearwardly (in a manner to be described subsequently) against the force of spring 38 to engage the clutch 31.

Figure 9:
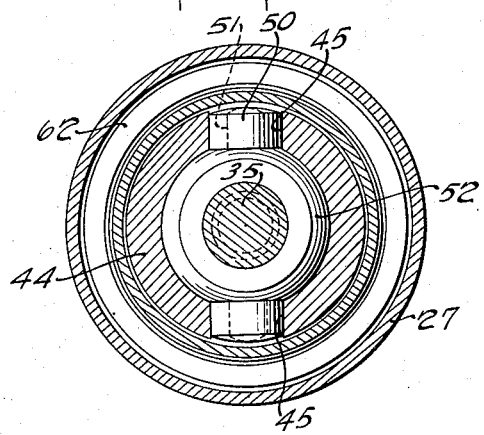
Fig. 9 is a cross section, as indicated by arrows 9—9 in Fig. 1, which discloses how the accumulator member is connected to the drive rod.
Figure 10:
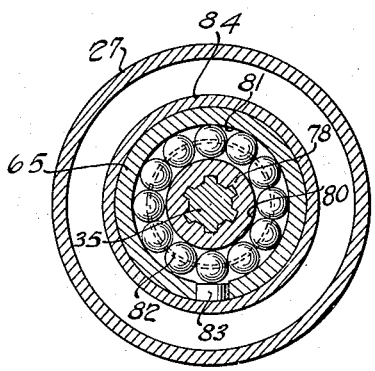
Fig. 10 is a cross-section indicated by the arrows 10—10 in Fig. 1 and shows the bearing for the forward end of the drive rod.

The accumulator member comprises a mass of rubber 40 in the shape of a fluted cylinder, the cross section of which is best shown in Fig. 8. The rubber is vulcanized to metallic end plates 41 and 42 at the rearward and forward ends respectively. Rear plate 41 has a driving connection with the drive rod 35, comprising an annular flange 44 provided with open ended slots 45 (see Fig. 9), receiving rollers 50 mounted on studs 51 projecting from a yoke 52 which is keyed to the drive rod. A cup-shaped member 54 has a cylindrical portion surrounding the rollers to retain them on the studs and a radial flange whose inner end separates the yoke 52 from the flange 39 on the drive rod 35.

The impact clutch 55, which is located at the forward end of the rubber accumulator 40, comprises a driving plate 56 and a driven plate 57, both plates being apertured to receive the drive rod for longitudinal and rotative movement relative thereto. Any suitable means may be employed for joining driving plate 56 to end plate 42 on the accumulator. Referring to Figs. 6 and 7, the rearward face of the driving plate has an annular boss 58 provided with three radial grooves 59 of dove-tail shape. The accumulator end plate 42 is provided with three cooperating dove-tail projections 60 adapted to be received within the grooves to connect the two plates in driving relation. A sleeve 62 surrounding the accumulator member, is telescoped at one end over the boss 58 on the clutch driving plate 56. The sleeve may be secured to the driving plate by welding, as indicated at 63.

The driven plate 57 is in the form of a flange on the rear end of a one-piece wrench member 65, the front end of which is provided with a socket portion 66 adapted to receive and drive a nut, such as 67. The wrench member is supported for rotation and limited sliding movement in a bearing 68 at the front end of guide casing 27. An annular flange 69 on the bearing engages cooperating shoulders 70 and 71 on the wrench member and casing respectively to limit forward movement of the wrench member.

The driving plate 56 of the impact clutch 55 is urged at all times in the direction of the driven plate by means of a compression spring 73 surrounding a reduced portion of the drive rod 35 and interposed between the shoulder 74 on the rod and the rear face of the driving plate 56. This spring tends to hold the clutch plates in engagement. The driven plate 57 is held against movement away from the driving plate, due to its connections at the front end of the drive rod 35. Such connections comprise a threaded extremity 76 on the rod, a retaining nut 77, and a sleeve 78 whose front end is retained by the nut. Sleeve 78 is keyed to rotate with drive rod 35. Means are provided to hold the driven plate 57 (integral with the wrench member 65) against axial movement with respect to sleeve 78. This means comprises cooperating raceways 80, 81 formed on the sleeve and wrench member respectively, and a set of steel balls 82 located in the annular space provided by the raceways. The balls permit the wrench member 65 and driven plate 57 to rotate freely relative to the drive rod 35, but prevent relative axial movement. The balls are retained by means of a plug 83 closing the ball admission bore and a retainer ring 84 surrounding the plug. A sleeve 85 surrounds the spring 73 to prevent the rubber 40 from being forced against the spring when the rubber is torsioned in a manner to be subsequently described.

Figure 11:
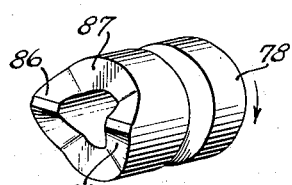
Fig. 11 is a perspective of the cam sleeve adapted to disengage the impact clutch.
Figure 12:
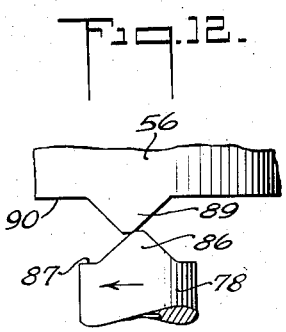
Fig. 12 is a fragmentary elevational view of the cam sleeve and clutch driving plate with the parts in the declutching position.

An important feature in the invention resides in the means for positively declutching the impact clutch against the pressure of spring 73. The declutching device includes sleeve 78 which has a pair of cam projections 86 at its rearward end, as seen in Fig. 11. Flat surfaces 87 are provided between the projections. The cams 86 are engageable with similar cams 89 and flats 90 formed on the front face of the clutch-driving plate 56. The cam portion of the driving plate is of sufficiently small outside diameter to clear the teeth 57a on the driven plate. Cams 86 and 89, when viewed from the side, appear substantially in the shape of an isosceles triangle. The apices of the cams 86 are adapted to ride over the surface of the adjacent portion of the plate 56 in either direction, and are engageable successively with the flats 90 and the sides and apices of the cooperating cams 89. When the edges of the cams 86 engage the flats, impact clutch teeth 56a and 57a are held in mesh by spring 73. Relative movement of the cams 86 to a position in which the apices are approximately aligned, forces the clutch driving plate 57 rearwardly against spring pressure to disengage the impact clutch.

The operation of the illustrative embodiment of the invention will now be described. Assume that the parts are in the Fig. 1 position with the wrench member 65 out of engagement with the nut to be driven. The motor (not shown) is started to cause rotation of the driver spindle 20. The disengaging clutch 31, which is held in declutching position by spring 38, cuts off power from the parts at the front end of the device. The teeth of the impact clutch 55 mesh, however, due to the action of the spring 73.

When the operator places the wrench socket 66 over the nut 67 and forces the gear casing 23 and guide casing 27 forwardly, the wrench member 65 moves rearwardly with respect to the guide casing. Axial movement of the wrench member is transmitted through the balls 80, cam sleeve 78, and drive rod 35 to force the clutch 31 into engaging relationship as shown in Fig. 2. Power is thereafter delivered to the wrench member through the drive rod 35, yoke 52, rollers 50, flange 45, rubber accumulator member 40, impact clutch driving plate 56 and driven plate 57, which is integral with the wrench member. Before the nut is seated it offers little resistance to the rotation of the wrench. During the time that the parts are in the Fig. 2 position, driving plate 56 of the impact clutch 55 rotates continuously at the same speed as the drive rod 35 which carries the cam sleeve 78. The relation between the cam sleeve and the driving plate 56 is such that the cams 86 on the former engage flats 90 on the latter. The slight reaction due to the friction between the nut and bolt causes the rubber member 40 to twist through an arc of a few degrees, which correspondingly alters the phase relation between cams 86 and 89. The circumferential length of the flats 90, however, permits orientation of the cams within the limits ordinarily encountered in driving a free running nut without declutching the impact clutch. After the rubber 40 has been torsioned, the cams 86 and 89 continue to rotate in this adjusted relationship at the same speed, until such time that resistance of the driven nut becomes abnormal.

As the driven nut reaches its seat 92 (see Fig. 3), rotation of the wrench member 65 and driven clutch plate 57 is retarded or temporarily stopped. The driving plate 56, which is keyed to the front plate of the rubber accumulator 40 is momentarily held against rotation by the engagement of the clutch teeth. While the rubber is held stationary at its front end, the rear end continues to rotate with the drive rod 35. As a result, the rubber is twisted and deformed as shown in Fig. 3. At the same time, the cams 89 attached to the driving plate 56 remain stationary and the cam sleeve 78 continues to turn. Cams 86 ride over the inclined surfaces of cams 89 until the cams become oriented to the Fig. 3 position. At this instant, the teeth 56a and 57a of the impact clutch are thrown out of mesh, thereby releasing the driving plate 56. Upon release of the driving plate, the rubber unwinds and converts its accumulated potential energy into kinetic energy by imparting momentum to the end plate 42, driving plate 56 and sleeve 62. The driving plate is free to rotate through an arc of 180° under the combined influences of its momentum, the unwinding of the rubber and continued rotation of the drive rod 35. During the lost motion period, cams 89 on the driving plate overtake the flats 87 on the rotating cam sleeve 78 to permit spring 73 to restore impact clutch 55 to meshing position, whereupon driving lugs 56a strike driven lugs 57a to impart a jar to the wrench member 65 in the tightening direction. At the instant the blow is delivered, the impact clutch and cams are again in approximately the Fig. 2 position. Continued application of power to the accumulator member 40 again torsions the rubber, declutches the impact clutch and delivers blows to the wrench in rapid succession.

The force of the successive blows or jars is substantially uniform and the number of blows is therefore an indication of the tightness of the nut against the surface 92 (Fig. 3). If the wrench be held against the nut for too long a period, there is danger that stripping of the threads or other damage may occur. It is, therefore, imperative that the operator be able quickly to disconnect the source of power from the nut. In order to cut off the power, the operator releases axial pressure against the gear case 63 which permits the disconnecting spring 38 to disengage the clutch 31.

The invention is suitable for driving elements having either a right or left-hand thread and for either tightening or loosening the threaded elements. Referring to Figs. 4 and 5, the driving teeth 56a, driven teeth 57a and cams 86 and 89 are all symmetrically arranged and adapted to operate in either direction. The side faces of the teeth are all in radial planes which insures that the blow will be evenly distributed over the impacting surfaces irrespective of the direction of rotation. The cams are so constructed that they taper from the apex evenly on both sides. These cams therefore may override each other in either direction.

What is claimed is:

1. A clutch mechanism comprising a continuously rotatable drive rod, a driven member, and a clutch connecting the drive rod and member, and adapted to impart to the latter a series of intermittent rotary movements, said clutch comprising a driven plate integral with said driven member, a driving plate connected to the drive rod through a torsional elastic connection, said plates having separable spaced teeth adapted to retard rotation of the driving plate when the driven member encounters resistance and while the drive rod continues to rotate, yieldable means constantly urging one of the plates toward a position in which the teeth engage, and positive means separate from said clutch teeth for forcing the last-mentioned plate in the opposite direction to declutch the teeth, thereby causing the driving plate to deliver a rotational impact to the driven plate under the influence of the elastic connection.

2. A clutch mechanism according to claim 1 in which the positive means comprises cooperating cam elements, one of which is rotatable with the drive rod and the other with the clutch driving plate.

3. A clutch mechanism according to claim 1 in which the positive means comprises cooperating cam elements, one of which is rotatable with the drive rod and the other with the clutch driving plate, said elements having spaced projections adapted to register when the lag of the driving plate with respect to the drive rod attains a predetermined angle, said cam elements having connections with the respective clutch plates adapted to declutch the latter when the projections register.

4. A clutch mechanism according to claim 1 in which the positive means comprises cooperating cam elements, one of which is rotatable with the drive rod and the other with the clutch driving plate, the clutch teeth and cam elements being constructed and arranged to operate in either direction of rotation.

5. A clutch comprising a driving and a driven element connected together for relative axial and rotative movement, disengageable shoulders on the two elements for holding them against relative rotation while the shoulders are in engagement, the driven element being adapted to drive a device encountering resistance, a torsional member imparting torque to the driving element and adapted to be placed under torsional strain when the encountered resistance is transmitted to it through the shoulders, a declutching device adapted to force the elements apart and free the shoulders to permit rapid turning of the driving element by the torsional means, and reclutching means for moving the elements together subsequent to their separation, whereby to cause the driving element to deliver a rotative jar to the driven element through cooperating shoulders, said shoulders having engaging surfaces lying in a plane which includes the axis of rotation.

6. A portable power operated wrench for nut running and the like comprising a shaft driven by a prime mover, an energy accumulator driven by said shaft, said accumulator being torsionally resilient, inertia means driven by said accumulator, an impact clutch comprising a driving and a driven plate having circumferentially spaced disengageable shoulders for driving engagement, the driving plate being connected to the inertia means and the driven plate being rigidly connected to a wrench socket, said impact clutch being adapted to transmit the reaction of the wrench socket to the accumulator to torsion the latter, automatic means for separating said clutch shoulders whenever the accumulator has been torsioned through a predetermined angle whereby the inertia means is released and caused to speed up under the influence of the accumulator, and means for automatically causing said clutch shoulders to reengage after each separation, characterized in that the means for separating the clutch shoulders comprises engageable cams, one of which is carried by the driving clutch plate and the other of which is carried by the shaft in fixed angular relationship thereto.

7. A portable power operated wrench according to claim 6 in which the engaging surfaces of the shoulders lie in a plane which includes the axis of the shaft whereby impacts delivered to the driven clutch plate are in a tangential direction.

8. A portable power operated wrench for nut running and the like comprising a shaft driven by a prime mover, an energy accumulator driven by said shaft, said accumulator being torsionally resilient, inertia means driven by said accumulator, an impact clutch comprising a driving and a driven plate having circumferentially spaced disengageable shoulders for driving engagement, the driving plate being connected to the inertia means and the driven plate being rigidly connected to a wrench socket, said impact clutch being adapted to transmit the reaction of the wrench socket to the accumulator to torsion the latter, automatic means for separating said clutch shoulders whenever the accumulator has been torsioned through a predetermined angle whereby the inertia means is released and caused to speed up under the influence of the accumulator, and means for automatically causing said clutch shoulders to reengage after each separation, characterized in that the engaging surfaces of said shoulders are disposed in a plane at right angles to said clutch plates.

9. A portable power operated wrench for nut running and the like, comprising a continuously rotatable shaft adapted to be driven by a prime mover, a rotatable inertia member, an elastic driving connection between said shaft and inertia member yieldingly permitting limited angular displacement of the inertia member with respect to the shaft, a rotatable wrench socket, an impact clutch intermittently connecting the inertia member with the socket to drive the latter, said impact clutch comprising a driving plate carried by the inertia member and a driven plate non-rotatably connected to the socket, said plates having engageable teeth separated by spaces permitting lost motion of the driving plate upon disengagement from and prior to reengagement with the driven plate, said plates being yieldingly held in engagement, and automatic declutching means for momentarily disengaging the plates of the impact clutch whenever the inertia member lags behind the shaft by a predetermined angle to permit the inertia member to speed up under the influence of the elastic driving connection, said declutching means comprising complementary engageable cam elements, one of which is carried by the shaft and the other of which is carried by the inertia member, whereby to cause the inertia member to deliver a series of torsional impacts to the socket through the impact clutch.

10. A portable power operated tool for nut running and the like, comprising a housing, a driven element rotatably supported in a bearing at the front end of the housing, a continuously rotatable shaft arranged within said housing, a flywheel comprising a sleeve surrounding a portion of the shaft and a clutch driving plate rigidly secured to the front end of the sleeve, a clutch driven plate in front of the driving plate and connected non-rotatably to the driven element, said plates having laterally projecting engageable teeth separated by spaces permitting lost motion of the driving plate whenever the plates are momentarily moved apart, elastic connecting means between the shaft and flywheel urging the clutch driving plate forwardly into engagement with the driven plate and resisting relative rotation between the flywheel and shaft, and declutching means for automatically moving the flywheel rearwardly to disconnect the clutch plates momentarily whenever the flywheel lags behind the shaft by a predetermined angle, said declutching means comprising a cam carried by the shaft and having a rearwardly facing inclined surface, a cooperating abutment member carried by the flywheel and held in engagement with said inclined surface by said elastic connecting means and adapted to be forced positively in a rearward direction by said cam upon relative rotation therebetween.

11. A portable power operated tool according to claim 10 in which the elastic connecting means resists relative rotation of the flywheel and shaft in either direction away from a normal phase relation, and in which the cam has two inclined surfaces sloping in opposite directions, whereby said tool is operable in either direction of rotation.

LEON F. MEUNIER.